(12) United States Patent
Jean et al.

(10) Patent No.: US 7,632,041 B2
(45) Date of Patent: Dec. 15, 2009

(54) WAVE POWER GENERATOR SYSTEMS

(75) Inventors: Philippe F. Jean, Nice (FR); Guillaume A. Ardoise, Nice (FR); Jack Pollack, Monaco Cedex (MC)

(73) Assignee: Single Buoy Moorings, Inc. (CH)

( * ) Notice: Subject to any disclaimer, the term of this patent is extended or adjusted under 35 U.S.C. 154(b) by 20 days.

(21) Appl. No.: 12/036,026

(22) Filed: Feb. 22, 2008

(65) Prior Publication Data

US 2008/0267712 A1 Oct. 30, 2008

Related U.S. Application Data

(60) Provisional application No. 60/926,177, filed on Apr. 25, 2007, provisional application No. 60/994,773, filed on Sep. 21, 2007.

(51) Int. Cl.
*E02B 9/08* (2006.01)

(52) U.S. Cl. ........................................ 405/76

(58) Field of Classification Search .................... 405/75, 405/76, 77, 78
See application file for complete search history.

(56) References Cited

U.S. PATENT DOCUMENTS

| | | | |
|---|---|---|---|
| 3,487,228 A | * | 12/1969 | Kriegel .......................... 405/76 |
| 3,846,990 A | | 11/1974 | Bowley |
| 4,404,490 A | | 9/1983 | Taylor et al. |
| 4,531,063 A | * | 7/1985 | Vielmo et al. .................. 405/76 |
| 4,685,296 A | | 8/1987 | Burns |
| 5,548,177 A | * | 8/1996 | Carroll ........................... 60/497 |

(Continued)

FOREIGN PATENT DOCUMENTS

WO    WO96/25769    8/1996

(Continued)

OTHER PUBLICATIONS

Polymer Power: Dielectric Elastomers and Their Applications in Distributed Actuation and Power Generation, Harsha Prahlad, et al., Proceedings of ISSS 2005, International Conference on Smart Materials Structures and Systems, Jul. 28-30, 2005, Bangalore, India.

(Continued)

*Primary Examiner*—Frederick L Lagman
(74) *Attorney, Agent, or Firm*—Leon D. Rosen

(57) ABSTRACT

Systems are provided for obtaining electrical energy from sea waves using deflectable material, especially EAP (electroactive polymers) type SSM (stretchable synthetic material) that generates electricity when an electrostatic charge is applied to the polymer and it is stretched. In one system (10), a buoyant element (12) has upper and lower parts (14, 22) connected by a quantity (36) of SSM, with the lower part anchored at a fixed height above the sea floor (24) and with the upper part movable vertically to stretch and relax the SSM as waves pass over. In another system (50) the buoy is rigid, but is anchored to the sea floor by at least one line (60) that includes, or is connected to at least a length (64) of SSM material. In still another system (160) a plurality of rigid buoys (162) that float on the sea surface, are connected in tandem by SMM (166, 172) that is stretched and relaxed as the buoys pivot relative to each other in following the waves. The buoys preferably lie with at least 80% of their volume below the average sea surface.

13 Claims, 6 Drawing Sheets

U.S. PATENT DOCUMENTS

| | | | |
|---|---|---|---|
| 5,552,657 A | | 9/1996 | Epstein et al. |
| 5,578,889 A | * | 11/1996 | Epstein .................. 60/497 |
| 5,889,354 A | | 3/1999 | Sager |
| 6,229,225 B1 | | 5/2001 | Carroll |
| 6,291,904 B1 | | 9/2001 | Carroll |
| 6,291,930 B1 | | 9/2001 | Sager |
| 6,392,314 B1 | * | 5/2002 | Dick ...................... 60/507 |
| 6,476,511 B1 | | 11/2002 | Yemm et al. |
| 6,577,039 B2 | | 6/2003 | Ishida et al. |
| 6,583,533 B2 | | 6/2003 | Pelrine et al. |
| 6,695,536 B2 | * | 2/2004 | Sanchez .................. 405/76 |
| 6,768,246 B2 | | 7/2004 | Pelrine et al. |
| 6,812,624 B1 | | 11/2004 | Pei et al. |
| 7,038,357 B2 | | 5/2006 | Goldenberg et al. |
| 7,199,501 B2 | * | 4/2007 | Pei et al. .................. 310/311 |
| 2004/0061338 A1 | * | 4/2004 | Woodbridge .................. 290/53 |
| 2007/0257490 A1 | | 11/2007 | Kornbluh et al. |
| 2009/0056327 A1 | * | 3/2009 | Raikamo et al. .............. 405/76 |

FOREIGN PATENT DOCUMENTS

| | | |
|---|---|---|
| WO | WO98/55764 | 12/1998 |
| WO | WO99/65088 | 12/1999 |

OTHER PUBLICATIONS

"Dielectric Elastomers: Generator Mode Fundamentals and Applications", Ron Pelrine, et al., Proceedings of SPIE, vol. 4329, Electroactive Polymer Actuatorsand Devices 2001, from Smart Structures and Materials Symposium 2001, Mar. 4-8, Newport Beach, California, U.S.A.

* cited by examiner

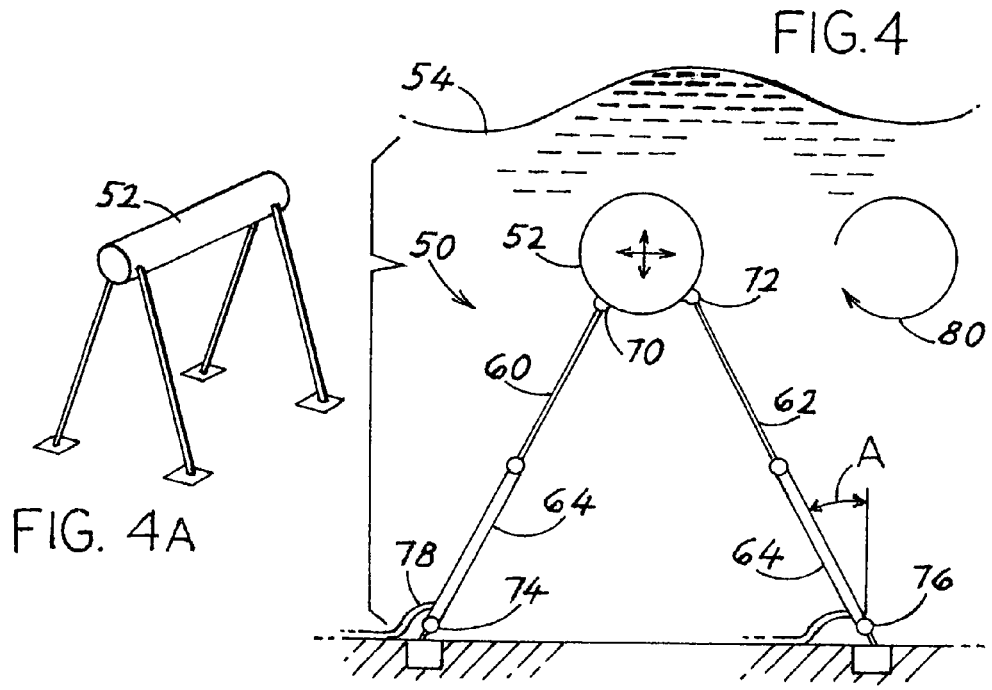
FIG. 4
FIG. 4A
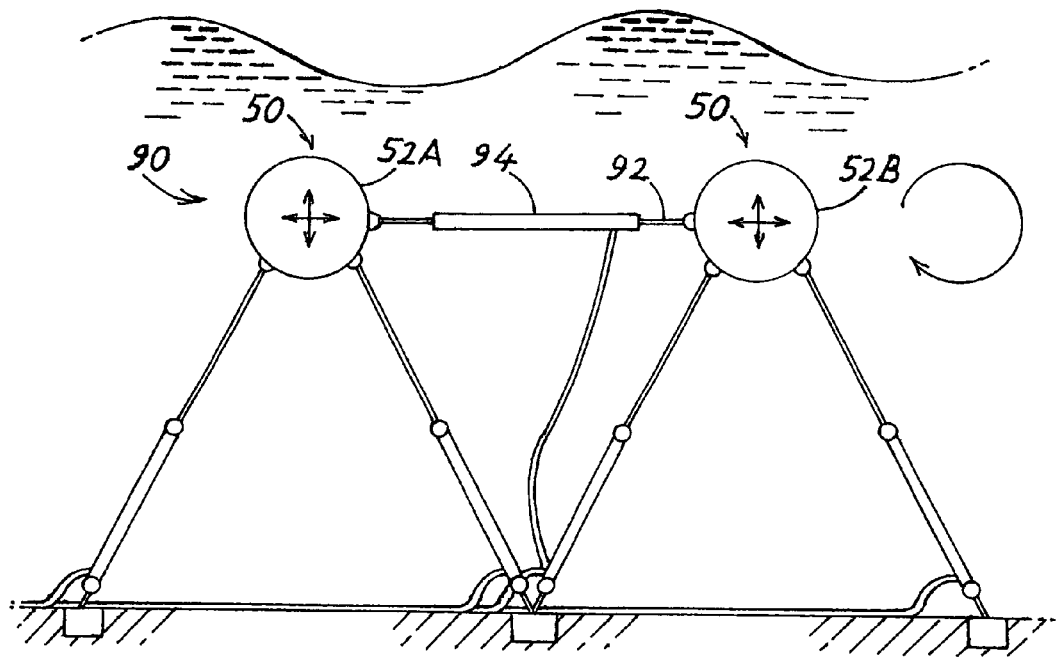
FIG. 5

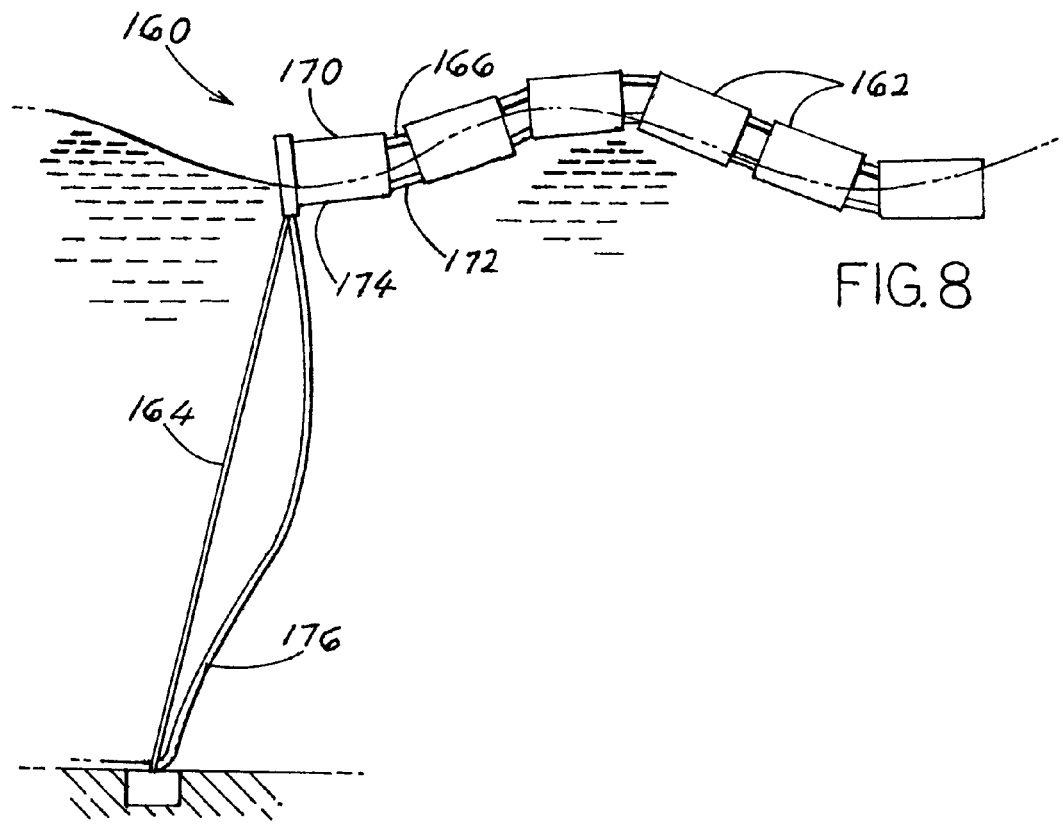
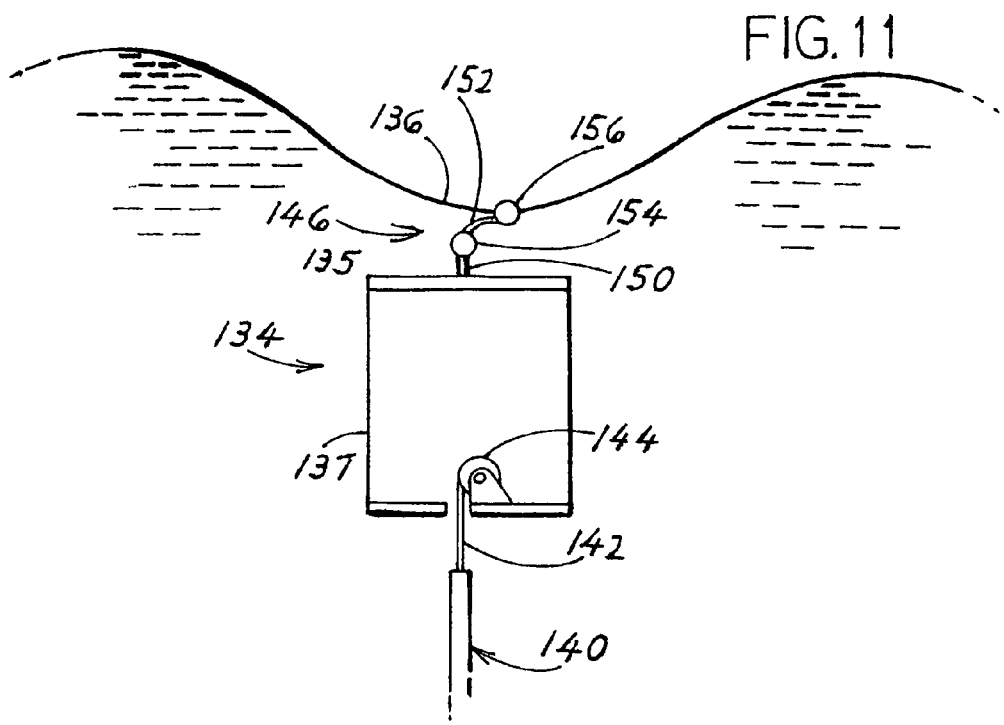

WAVE POWER GENERATOR SYSTEMS

CROSS-REFERENCE

Applicant claims priority from U.S. provisional patent applications 60/926,177 filed Apr. 25, 2007 and 60/994,773 filed Sep. 21, 2007.

BACKGROUND OF THE INVENTION

Wave energy is concentrated at the sea surface, such as within 25 meters of the surface. Wave energy decreases with depth below the surface. Near the surface, there is vigorous movement of water up and down and horizontally, and the pressure of water repeatedly increases as a wave crest moves over a location and repeatedly decreases as the trough of a wave moves over the location. Several systems have been proposed for converting wave energy into electricity, as in U.S. Pat. No. 6,229,225 by Carroll, where a mooring line that holds a buoy operates a deep underwater hydraulic pump and electrical generator. Any electricity-generating device that lies under water should be as simple as possible.

There have been recent developments of SSM (synthetic stretchable material) such as EPA (electro active polymers) which generates electricity when its opposite sides contain opposite electrostatic charges and the distance between its ends changes, as when it is stretched. Such synthetic stretchable material is described in U.S. Pat. Nos. 6,768,246 by Pelrine; 6,812,624 by Pei; and 7,038,357 by Goldenberg; and US publication 2001/0029401 by Ishido. Applicant provides systems for generating electricity from wave energy, using stretching and/or relaxing of these synthetic stretchable materials that are used as conductors.

SUMMARY OF THE INVENTION

In accordance with the present invention, systems are provided for producing electricity from wave energy, using simple synthetic stretchable material in an efficient manner. In one system, an element is provided that includes a lower part anchored at a fixed height above the sea floor and an upper part that lies closely under the sea surface and that is movable vertically relative to the lower part. A quantity of electrostatically charged SSM (synthetic stretchable material) lies between the upper and lower parts and generates electricity when the upper part moves upward under a wave trough and/or the upper part moves downward under a wave crest. In one example of a system of this type, the upper and lower parts of the element form upper and lower walls of a chamber that contains pressured air that biases the upper and lower walls apart. The SSM extends between the upper and lower walls. When a wave trough passes above the element, the upper wall moves upward and stretches the synthetic stretchable material to produce electricity.

In another system, the buoyant element is a simple buoy, and an anchor line that anchors the buoy to the sea floor includes a length of SSM that stretches and relaxes as the buoy moves up and down in the waves. A multi-anchored system can be provided wherein a plurality of tethered anchor lines with widely spaced lower ends, is used to moor the buoy to limit its horizontal movements, as well as its vertical movements. Each anchor line is provided with or connected to SSM to generate electricity. A plurality of such multi-anchored systems can be connected together by primarily horizontal stabilizing lines that also include SSM.

When the SSM material withdraws energy from the waves, it also damps the waves. Such dampening of waves can be useful to protect offshore structures.

The buoy is anchored so the anchor line is always under tension. A system can be provided that shortens and lengthens the anchor line(s), especially to move down the buoy in a large storm, and to allow the buoy to rise, to perform maintenance on it. During use to generate electricity or calm the waves, the buoy is preferably held so at least 80% of its volume lies under the average sea surface, and most of that lies within 25 meters of the sea surface.

The novel features of the invention are set forth with particularity in the appended claims. The invention will be best understood from the following description when read in conjunction with the accompanying drawings.

BRIEF DESCRIPTION OF THE DRAWINGS

FIG. 4 is a side elevation view of a wave power generating system of another embodiment of the invention, wherein SSM (synthetic stretchable material) is used in an anchor line, and wherein the buoy is held by a plurality of anchor lines.

FIG. 5 is a side elevation view of a wave power generating system of another embodiment of the invention wherein a primarily horizontal line of SSM material connects two buoys of two systems of the type shown in FIG. 4.

FIG. 8 is a side elevation view of a wave power generating system which includes a series of tandem-connected rigid buoys that floats on the sea surface to undulate with the waves, and with SSM material lying between the buoys to generate electricity as the buoys pivot relative to each other.

FIG. 11 is a partial sectional view of a system that varies the height of a buoy according to the height of waves.

DESCRIPTION OF THE PREFERRED EMBODIMENTS

Figure 1:
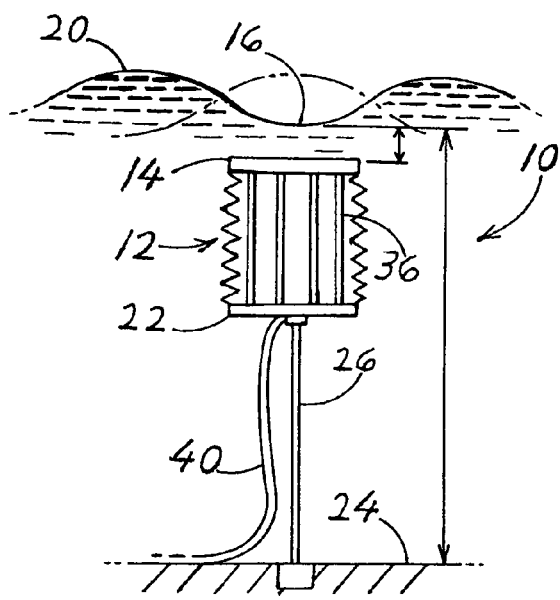
FIG. 1 is a side elevation view of a wave power generating system of the invention, shown when a wave trough is passing over the buoyant element.
Figure 2:
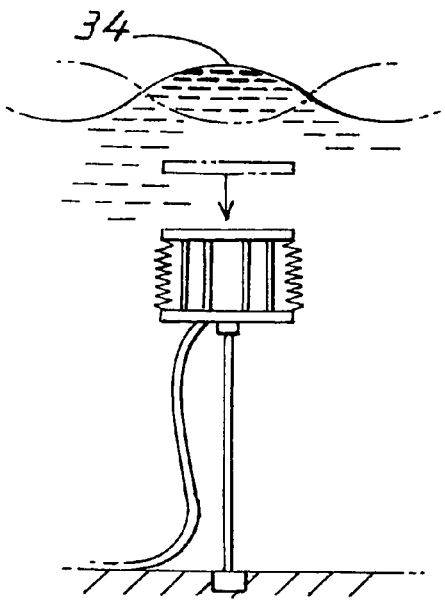
FIG. 2 is a view similar to that of FIG. 1, shown when a wave crest is passing over the buoyant element.
Figure 3:
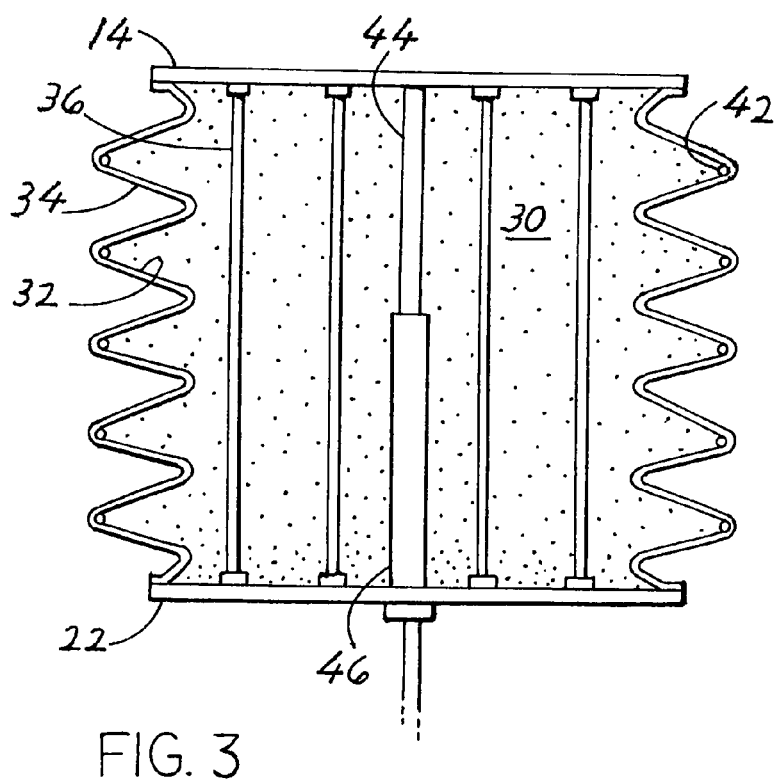
FIG. 3 is a sectional view of the buoyant element of the system of FIG. 1.

FIG. 1 shows a wave power generating system, or generator, 10 which includes a buoyant element 12 in the form of a buoy that lies in the sea, and that has an upper part 14 that lies closely under the troughs 16 of sea waves 20. The element 10 has a lower part 22 that is anchored to the sea floor 24 by an ordinary (e.g. steel cable) tether line, or anchor line 26. The buoy 12 has a construction such as shown in FIG. 3, with slightly pressured air 30 lying in a chamber 32 formed between the upper and lower parts 14, 22 and within a bellows side wall 34. When the trough 16 of a wave moves to a position over the buoy, the water pressure in the sea closely below the trough decreases. The buoy upper part 14 then moves up to the position of FIG. 1 under the upward spring bias of pressured air in the chamber. When the crest 34 (FIG. 2) of a wave moves to a position over the buoy, the water pressure in the sea closely below the crest increases while water moves into the region above and around the buoy. The buoy upper part 14 then moves down to the position of FIG. 2 while compressing air in the buoy. The exact changes in pressure and movements of water have not been analyzed in detail, but the above describes the general changes occurring in waves.

FIG. 3 shows that the buoy contains quantities 36 (as in U.S. Pat. No. 7,038,357) of SSM (synthetic stretchable material) that extend between the upper and lower parts 14, 22, or at least part of the distance between them. Whenever the height of the buoy increases, the SSM is stretched and expanded, and whenever the height of the buoy decreases the SSM contracts. The SSM at 36 generates electricity when it undergoes a change in length (which can be done by a change in surface). In this description it is assumed that the SSM or other electricity-generating deflectable material is electrostatically charged. FIG. 1 shows an electrical cable 40 extending from the buoy to the sea floor, with the cable then extending to a facility (on or off shore) that uses the electricity. FIG. 3 shows rigid rings 42 that prevent horizontal bellows collapse, and a piston and cylinder 44, 46 that minimizes tilt. It is possible to use a large sleeve-shaped quantity of SSM to form the side walls of the chamber, in place of the bellows.

The wave height in the ocean varies, with a wave height under one meter and wave period under 7 seconds considered to be a very calm condition. A wave height of 1 to 4 meters and wave period of 10 to 15 seconds is considered to be normal. A wave height greater than 4 meters and wave period of more than 18 seconds is a storm, such as a one time-in-10 years storm. The average sea height is halfway between the crest and trough of waves in calm conditions.

FIG. 4 shows another system 50 of the invention wherein a float or buoy 52 is held closely under the sea surface, and more particularly a majority of its volume is under the height of troughs 54 of normal waves (1 to 4 meters height) so the buoy is always biased upward. The buoy is anchored by at least one anchor line, with a plurality of anchor lines 60, 62 shown. Each anchor line is connected to or includes, or is otherwise coupled to at least a section 64 of SSM material (which may be in the form of a roll) which generates electricity when the section changes in length. The anchor lines have upper ends 70, 72 that are attached to the buoy, and have lower ends 74, 76 that are connected to the sea floor at locations more widely spaced than their upper ends. As a result, each mooring line extends at an incline A to the vertical. The incline A is preferably at least 20° and more preferably 30° to 60° from the vertical so the electricity-generated deflectable material extends with significant horizontal components. Cables 78 carry away electricity. In FIG. 4, the buoy 52 is shown in a quiescent position which it occupies when there are no waves or water currents.

When a wave passes over the buoy 52, not only does water move up and down and the water pressure vary, but the water moves in a quasi-circular pattern as indicated at 80 which causes the buoy to move in circles. Since the SSM material 64 extends with horizontal components, they elongate and contract as the buoy moves horizontally, to generate electricity. FIG. 4A shows that the buoy 52 is cylindrical and is anchored by four anchor lines.

It is usually necessary that the SSM material be isolated from water in the sea. FIG. 11 shows that this can be done by placing the SSM material 64 within a hose or sleeve 82 of highly elastic waterproof material. The hose or sleeve 82 is preferably made of elastomeric material (Young's modulus of elasticity of less than 50,000 psi).

FIG. 5 shows another system 90 that includes a plurality of systems 50 of the type shown in FIG. 4, but with adjacent buoys 52A, 52B of the systems connected together by a primarily horizontal tie line 92. Each tie line includes a length 94 of SSM material. Not only does the horizontal length of SSM material generate electricity, but it prevents the buoys from hitting each other, so they can be placed close together. A large number of the systems 50 can be connected together in an array to generate considerable electrical energy. When the systems generate electricity, they also take energy from the waves, so the area occupied by the group of systems 50 and adjacent areas of the sea experience less energetic waves. Thus, the systems create a sheltered area for floaters or vessels.

Figure 6:
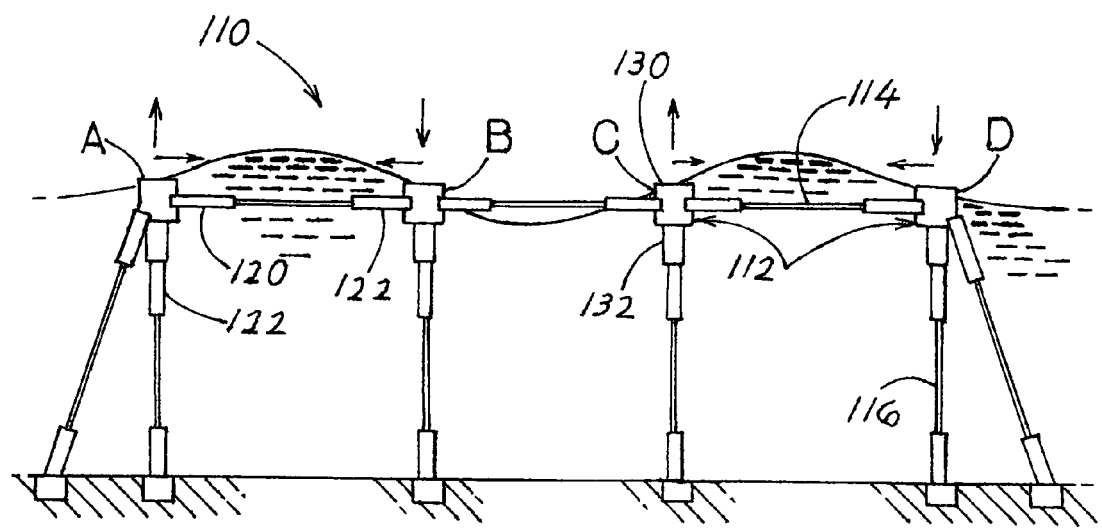
FIG. 6 is a side elevation view of a wave power generating system of another embodiment of the invention wherein a horizontal matrix of buoys are each anchored to the sea floor by a primarily vertical line and are connected together by primarily horizontal lines, where the vertical and horizontal lines each include SSM.
Figure 7:
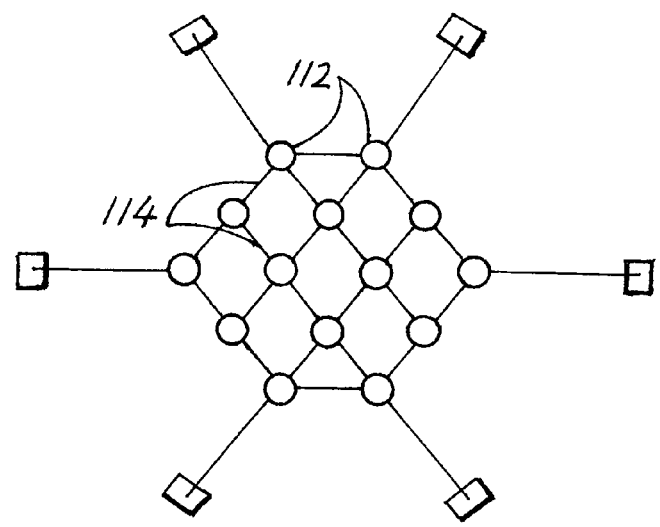
FIG. 7 is a plan view of the system of FIG. 6.

FIG. 6 shows another system 110 which includes an array of buoys 112, with adjacent pairs of buoy connected together by a primarily horizontal line 114, and with each buoy anchored by a tensioned anchor line 116. At least one quantity 120, 122 of SSM material lies along each horizontal line and along each anchor line. FIG. 7 shows that the buoys are arranged in a 2-dimensional array as seen in the plan view of FIG. 7. In FIG. 6, the top 130 of each buoy lies at the average sea height, and a bottom 132 of each buoy is constantly submerged in the sea. The height of waves varies, and the height shown in FIG. 6 is a compromise.

Applicant prefers to place the buoys of FIGS. 1-6 (and 12) that are held by taut anchor lines, so at least 80% of the volume of the buoy is immersed in the sea, in a calm sea. Thus, in FIG. 12, the height of a calm sea is indicated at 210, and is halfway between crests 212 and troughs 214. This assures that the taut anchor lines 216 will not slacken and possibly because damaged, except possibly in a once-in-10 years storm. Maximum vertical forces are achieved by locating all of the buoy volume under the sea troughs. However, it is desirable to make the presence of the buoy clear to avoid a collision with a vessel. A warning device such as a small buoy floating at the surface or a thin rod (thin relative to the buoy) projecting above the sea surface, can accomplish this.

FIG. 11 shows a system 134 that adjusts the height of the top 135 of a buoy 137 so the buoy top always lies at a height very close to the troughs 136 of waves, despite different weather that greatly changes the height of waves. The anchor line 140 that ties the buoy to the sea floor, includes an upper portion 142 with an upper end that is wound on a winch 144 that is energized by a small gearhead electric motor. A sensor 146 senses the height of the top of the buoy below the trough 136 of waves. The sensor includes lines 150, 152 and small buoys 154, 156 at their upper ends. As long as the line 150 remains under tension through the entire periods of the waves, but the higher line 152 occasionally becomes limp, the top 135 of the buoy is at the desired height. If both lines 152, 154 remain under tension through at least one entire wave period, then the buoy is too low, and the winch 144 is operated to raise the buoy. If the lower line becomes limp during a wave period the buoy is too high and is lowered. A variety of sensors can be used to sense the height of the buoy relative to the trough of the waves. To assure that the buoy will be urged up and down with considerable force as the waves pass over it, the buoy should lie closely under the waves, that is, the top of the buoy should lie no more than four meters, and more preferably no more than two meters, below the trough of the waves. The system can be used to lower the buoy if a large storm is approaching (this usually will be done automatically) and can be used to raise the buoy to the surface for maintenance and repairs.

FIG. 8 shows another system 160 which includes a series of rigid buoys 162 that float at the sea surface, and that are connected in tandem by SSM (synthetic stretchable material). One end of the series is anchored to the sea floor by an anchor line 164. SSM material 166 connects the upper ends 170 of adjacent buoys, and SSM material 172 connects the lower ends 174 of adjacent buoys. The buoys pivot with respect to one another as they float in a wave. The pivoting results in the SSM material 166, 172 stretching and relaxing and creating electricity that is carried out through an electrical cable 176.

Figure 9:
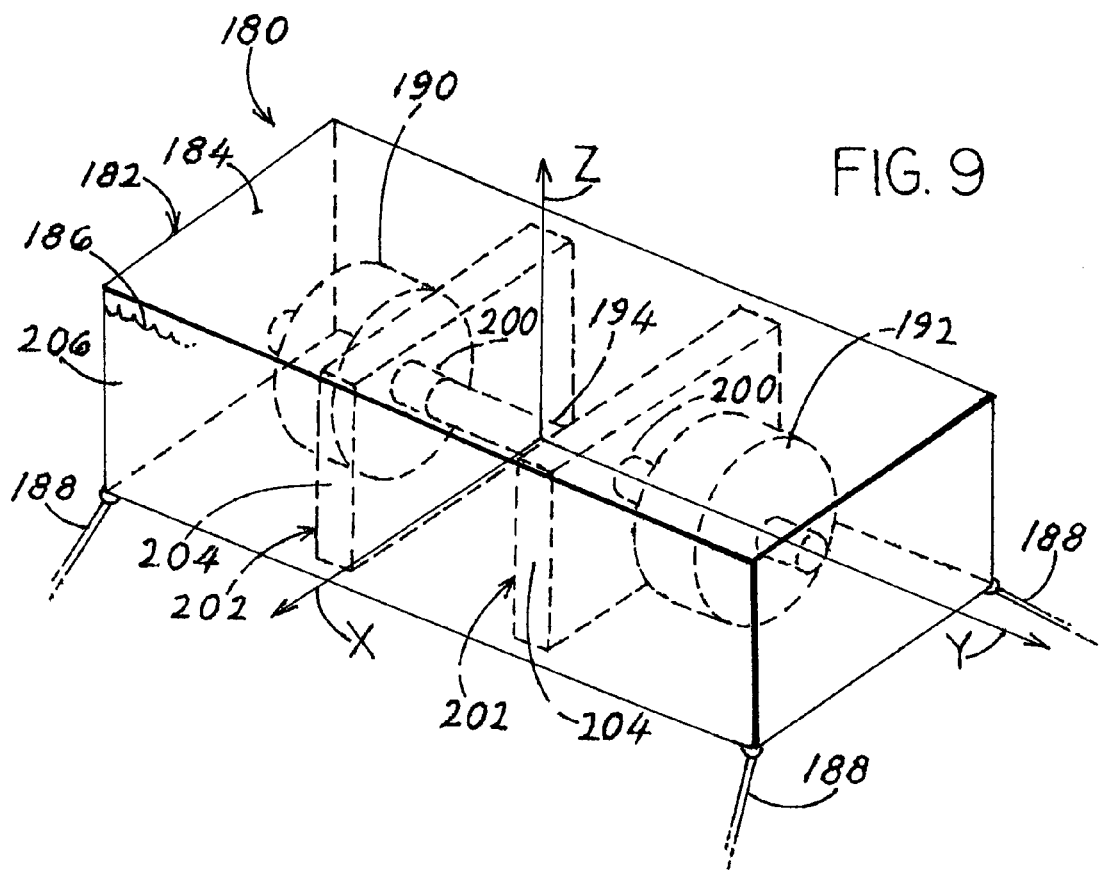
FIG. 9 is a partially sectional isometric view of a float of another embodiment of the invention that uses SMM material to support a weight and that produces electricity and damps waves.
Figure 10:
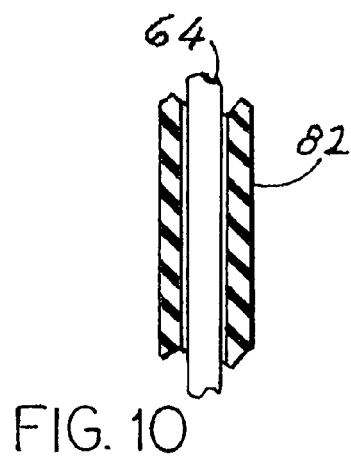
FIG. 10 is a sectional view of a portion an SSM line of the type shown in FIGS. 1-8.

FIG. 9 shows a system 180 which includes a buoy 182 with a top 184 that lies close to the sea surface 186 and that is anchored by four anchor lines 188 that extend in catenary curves to the sea floor. The buoy is intended to move up and down in the waves. A pair of weights 190, 192 are mounted on a shaft 194 that, in turn, is mounted on middle parts 200 of a pair of SSM (synthetic stretchable material) masses 202 that have outer parts 204 mounted on outer walls 206 of the buoy. When the buoy accelerates upward as the crest of a wave approaches, the lower part of the SSM material (below the middle parts 200) is compressed and the upper part is stretched. This creates electricity. The system 180 is useful not only to create electricity, but also to damp the waves by extracting energy from them.

Figure 12:
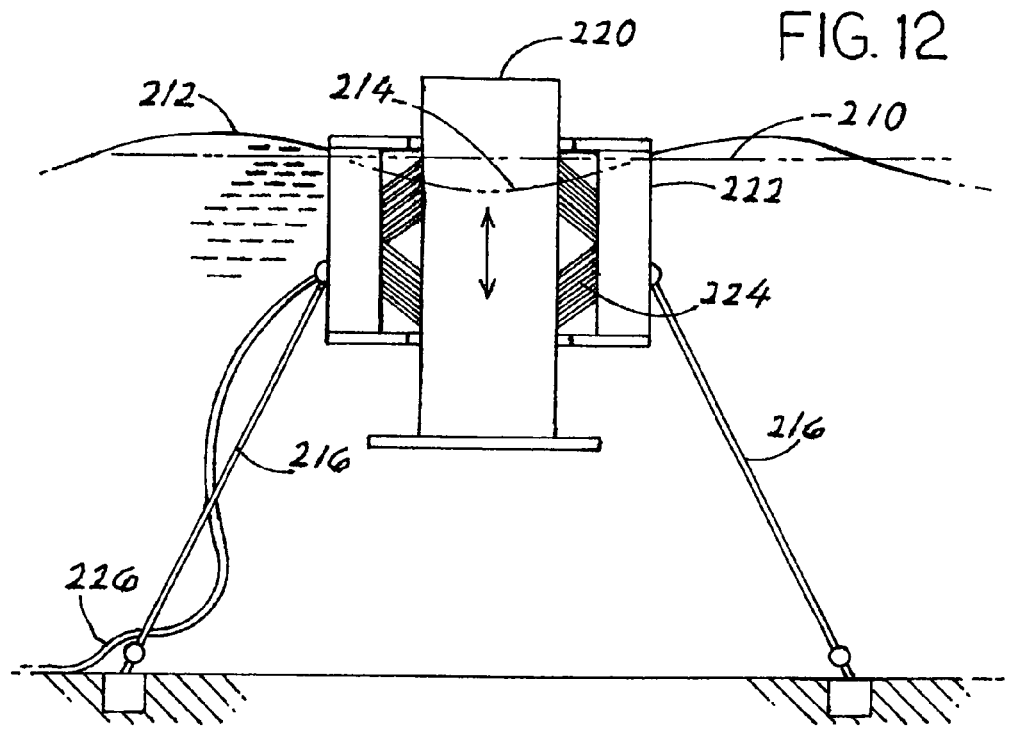
FIG. 12 is a side elevation view of a wave power generating system wherein a buoyancy module moves relative to a fixed float.

In FIG. 12 a moveable buoyant member 220 moves up and down in the waves, while a static member 222 is held against vertical movement by taut anchor lines 216. SSM material 224 couples the two members and is alternately stretched and relaxed as the buoyant member moves vertically, to generate electricity that is transmitted over a cable 226.

Figure 13:
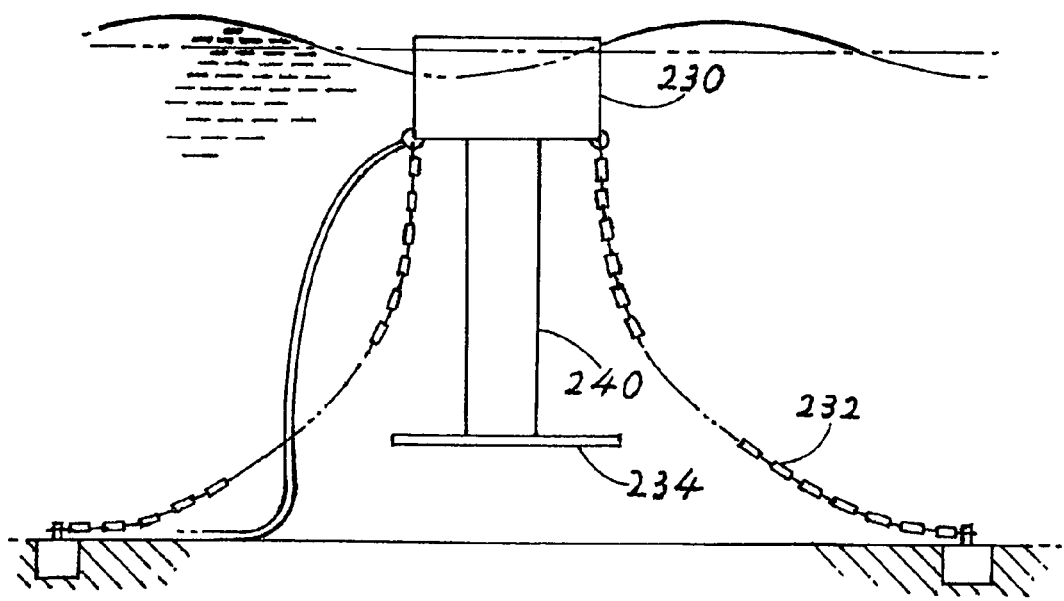
FIG. 13 is a side elevation view of a wave power generating system wherein a buoy moves relative to a largely stationary mass.

In FIG. 13 a vertically moveable buoyant member 230 is anchored by loose catenary lines 232 so the buoyant member 230 moves up and down in the waves. A brake 234 lies deep under water, by more than half the height of 25 meters of the wave zone, so the brake tends to remain static. As a result, a quantity 240 of SSM material coupled to the moveable buoyant member 230 and to the static brake 234 is alternately stretched and relaxed, and generates electricity. The systems of FIGS. 12 and 13 can be surface floating or submerged systems.

Thus, the invention provides systems for generating electricity (and/or reducing the effects of the waves on structures in the sea) from the waves using charged SSM (synthetic stretchable material) that absorbs energy as it stretches and relaxes and transforms the energy into electricity. The systems include buoys or buoyant bodies that lie close to the sea surface, in the wave action zone where water movement and/or pressure changes are a maximum as a result of waves. In one system, the movement of a displaceable top part of a buoy relative to a static bottom part of the buoy, is used to repeatedly stretch and relax SSM that connects the parts (often in series with a line of non-SSM material). In another system one or more lines containing SSM material, anchor a buoy to the sea floor, with the SSM material stretching every time the buoy rises as a wave crest passes over it and/or there is horizontal movement. In another system, a series of buoys float on the sea surface and are connected in tandem at their upper and lower ends by charged SSM material that stretches and relaxes as the buoys pivot relative to each other as they follow undulations in the waves. A means is provided to raise and lower a buoy as the height of the waves decreases and increases and for other purposes.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A wave power generator comprising:
   a float;
   a plurality of mooring lines with upper ends each connected to said float and with lower ends anchored to the sea floor at spaced locations chosen so the mooring lines diverge in a downward direction, said mooring lines each coupled to a quantity of deflectable material that generates electricity and that is positioned to stretch and contract as part of the mooring line.

2. The wave power generator described in claim 1 wherein:
   at least a first of said mooring lines extends at an angle of at least 20° to the vertical, so said first mooring line is tensioned by horizontal movement of the float.

3. The wave power generator described in claim 2 wherein:
   said first mooring line extends of an angle of 30° to 60° from the vertical.

4. The generator described in claim 1, including:
   at least one primarily horizontal tie line that connects a pair of said buoys, said tie line coupled to said deflectable material.

5. A wave power generator for use in a sea that has a sea surface of predetermined height above a sea floor, comprising:
   a float and a taut anchor line that extends from the sea floor to said float and that holds said float so at least 80% of the float volume lies below said sea surface height;
   a quantity of electricity-generating deflectable material, and means coupling said material to said anchor line for stressing and relaxing said material to generate electricity as the float is urged up and down by waves.

6. The generator described in claim 5 including:
   means responsive to the wave height for shortening said anchor line in large waves and lengthening said anchor line in smaller waves.

7. The generator describe in claim 5 wherein:
   said float lies completely under the height of the sea; and including
   a warning device that extends up from the float to the sea surface to indicate the presence of the float.

8. A wave power generator for generating electrical power from waves, comprising:
   apparatus that lies in the sea, said apparatus having a lower part anchored at a constant height above the sea floor and an upper part that lies primarily under the sea surface and that is moveable relative to said lower part;
   a quantity of electricity-generating deflectable material with opposite ends coupled respectively to said lower and upper parts, said quantity of deflectable material generating electricity when a distance between its ends is forced to change;
   said upper part of said apparatus being biased upward towards the sea surface with a force that decreases and increases as the height of a sea wave at said upper part respectively decreases and increases;
   said apparatus includes a chamber and said lower and upper parts form bottom and top walls of said chamber, said chamber containing means for urging said lower and upper parts away from each other;

said quantity of electricity-generating deflectable material has upper and lower end connected respectively to said top and bottom walls of said chamber.

9. The generator described in claim 8 wherein:

said means for urging said upper and lower parts away from each other comprises air.

10. A wave power generator for generating electrical power from waves, comprising:

apparatus that lies in the sea and that includes an upper part in the form of a buoy that lies primarily under the sea surface and a lower part that comprises a plurality of anchor lines anchored to the sea floor at locations spaced a plurality of meters apart, with said anchor lines extending along converging paths to said buoy, said buoy being moveable relative to said lower part, and at least one of said lines is maintained under tension by holding at least 80% of the volume of said buoy under the sea surface;

a quantity of electricity-generating deflectable material with opposite ends coupled respectively to said buoy and to at least one of said anchor lines, said quantity of deflectable material generating electricity when a distance between its ends is forced to change;

said buoy being biased upward towards the sea surface with a force that decreases and increases as the height of a sea wave at said upper part respectively decreases and increases.

11. A wave power generator for generating electrical power from waves, comprising:

apparatus that lies in the sea and that includes a plurality of buoys that each is moored at a height through an anchor line wherein an average of at least 80% of each buoy volume lies under the sea surface;

a quantity of electricity-generating deflectable material with opposite ends coupled respectively to said buoys and to said anchor lines, said quantity of deflectable material generating electricity when a distance between its ends is forced to change;

said buoys being biased upward towards the sea surface with a force that decreases and increases as the height of a sea wave respectively decreases and increases;

at least one primarily horizontal tie line that extends between pairs of said buoys and that includes a length of said electricity-generating deflectable material.

12. A wave power generator for generating electrical power from waves, comprising:

apparatus that lies in the sea, said apparatus having a lower part anchored at a constant height above the sea floor and an upper part that lies primarily under the sea surface and that is moveable relative to said lower part;

a quantity of electricity-generating deflectable material with opposite ends coupled respectively to said lower and upper parts, said quantity of deflectable material generating electricity when a distance between its ends is forced to change;

said upper part of said apparatus being biased upward towards the sea surface with a force that decreases and increases as the height of a sea wave at said upper part respectively decreases and increases;

said lower part is adjustable in length to raise and lower the height of said upper part above the sea floor;

means for sensing wave height, for adjusting the length of said lower part.

13. A wave power generator for use in a sea that has a sea surface of a predetermined average height above a sea floor, comprising:

a buoyant body with upper and lower portions;

an anchor line that extends from the sea floor to said buoyant body;

a quantity of electricity-generating deflectable material coupled to said anchor line and to said buoyant body, with said buoyant body held with an average of at least 80% of the buoyant body volume lying below said sea surface, for generating electricity as at least said upper portion of the buoyant body is urged up with a varying force by waves.

* * * * *